United States Patent
Chaitanya et al.

(10) Patent No.: US 10,430,415 B2
(45) Date of Patent: Oct. 1, 2019

(54) PERFORMING PREDICATE-BASED DATA COMPRESSION

(75) Inventors: Krishna R Chaitanya, Bangalore (IN); Sheena Tharakanparampil, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 1212 days.

(21) Appl. No.: 12/343,155

(22) Filed: Dec. 23, 2008

(65) Prior Publication Data

US 2010/0161650 A1 Jun. 24, 2010

(51) Int. Cl.
*G06F 16/2455* (2019.01)

(52) U.S. Cl.
CPC .............. *G06F 16/24552* (2019.01)

(58) Field of Classification Search
CPC ............. G06F 17/30067; G06F 3/0605; G06F 3/0683; G06F 16/24552
USPC ........................................................ 707/812
See application file for complete search history.

(56) References Cited

U.S. PATENT DOCUMENTS

| | | | |
|---|---|---|---|
| 5,675,789 A | 10/1997 | Ishii et al. | |
| 6,392,568 B1 * | 5/2002 | Cooper | ............ 341/51 |
| 7,383,270 B1 * | 6/2008 | Kostamaa et al. | ............ 707/693 |
| 7,440,963 B1 * | 10/2008 | Bello et al. | |
| 7,548,928 B1 * | 6/2009 | Dean | ............ H03M 7/3084 |
| 2003/0149793 A1 * | 8/2003 | Bannoura | ............ H04L 29/06 709/247 |
| 2003/0212694 A1 * | 11/2003 | Potapov et al. | ............ 707/100 |
| 2005/0015374 A1 | 1/2005 | Reinauer et al. | |
| 2005/0234686 A1 * | 10/2005 | Cheng et al. | ............ 703/2 |
| 2007/0162426 A1 * | 7/2007 | Brown | ............ G06F 16/24539 |
| 2008/0071748 A1 | 3/2008 | Wroblewski et al. | |
| 2008/0071818 A1 | 3/2008 | Apanowicz et al. | |
| 2008/0144079 A1 * | 6/2008 | Pandey et al. | ............ 358/1.15 |
| 2008/0294676 A1 * | 11/2008 | Faerber | ............ H03M 7/30 |
| 2009/0106281 A1 * | 4/2009 | Marwah | ............ H03M 7/30 |
| 2011/0320417 A1 * | 12/2011 | Luo et al. | ............ 707/693 |

OTHER PUBLICATIONS

Karp ("Indexing and Compressing SAS Data Sets: How, Why, and Why Not", nsug.org, 2000).*

* cited by examiner

*Primary Examiner* — Van H Oberly
(74) *Attorney, Agent, or Firm* — Richard A. Wilhelm

(57) ABSTRACT

Techniques for performing predicate-based data compression are provided. The techniques include specifying a predicate, wherein the predicate is specified by a user, and using the predicate to filter data compression, wherein using the predicate to filter data compression comprises compressing one or more subsets of data that satisfy the predicate.

20 Claims, 3 Drawing Sheets

PERFORMING PREDICATE-BASED DATA COMPRESSION

BACKGROUND OF THE INVENTION

Database management systems such as, for example, DB2 UDB (universal database) use data compression techniques to reduce storage requirements for a given database. One advantage of compression is that input/output (I/O) is reduced considerably, since lesser numbers of pages need to be read in to the page buffers. Existing approaches such as, for example the implementation in DB2 UDB for Windows/Unix/Linux will compress the entire table regardless of how frequently certain records are used. When a certain row needs to be accessed for a read or update, the data page is fetched onto the page buffer and the corresponding row is decompressed for usage. After usage, the row is compressed back and the data page is inputted and/or outputted to permanent storage.

However, there is a considerable central processing unit (CPU) overhead associated with compressing and decompressing data. Most of the time, the database manager might end up compressing data that is very often used and therefore use up many CPU cycles decompressing and compressing every time this data is accessed. There is no existing approach to specify predicate based compression for data that will make sure that only data that is not frequently used by database applications and/or users, which can be specified by a user predicate, need to be compressed. As such, within existing approaches, there are no ways for old and/or obsolete data to be compressed and stored on secondary storage, while current data that is frequently accessed to remain uncompressed so that the database manager does not have to go through the overhead of decompressing every time this data is accessed.

As noted above, existing approaches disclose no solutions to this problem. The existing implementation for data compression in DB2 UDB for Windows/Unix/Linux, for example, will compress the entire table regardless of how frequently certain records might be used.

Database administrators (DBAs) can be advised to partition their database and compress only that partition that contains less frequently used rows. While this is a workaround, it is not an advantageous solution for the problem. Partitions require their own indexes for access, and moreover, the current compression implementation in DB2, for example, requires each partition to have a separate compression dictionary.

Existing approaches also include further disadvantages. For example, some existing approaches do not include the ability to compress data based on a structured query language (SQL) type predicate. Others do not include a predicate, and consequently, user specification of the predicate clause is unavailable. Additionally, some existing approaches do not introduce new SQL statements related to data compression on rows. Other approaches compress the entire data in information unit or based on data filter stages. Further, some existing approaches allow for only the compression method to be selected based on the data type that is being compressed.

SUMMARY OF THE INVENTION

Principles of the invention provide techniques for performing predicate-based data compression.

An exemplary method (which may be computer-implemented) for performing predicate-based data compression, according to one aspect of the invention, can include steps of specifying a predicate, wherein the predicate is specified by a user, and using the predicate to filter data compression, wherein using the predicate to filter data compression comprises compressing one or more subsets of data that satisfy the predicate.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be road in connection with the accompanying drawings.

DETAILED DESCRIPTION

Figure 1:
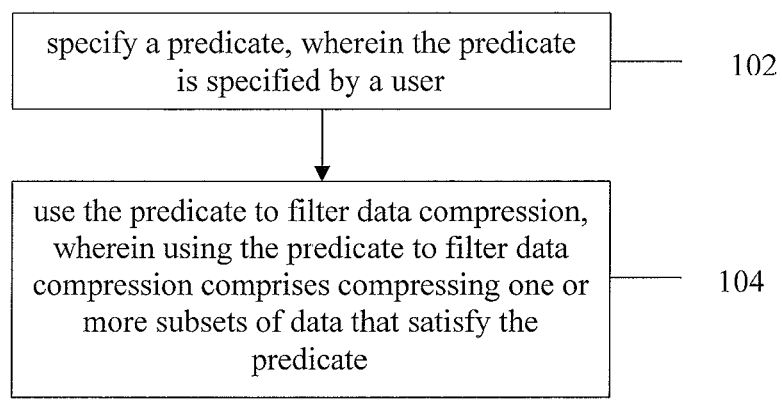
FIG. 1 is a flow diagram illustrating techniques for performing predicate-based data compression, according to an embodiment of the present invention.

Principles of the invention include performing predicate based compression for data rows in a relational database table. One or more embodiments of the invention compress data based on the usage statistics of the data as well as based on access frequency using a user specified predicate.

As noted above, there have been thoughts to having partition level compression, but compression is primarily a cost savings, with some run-time penalty. With the industry standard partitioning, partition-specific compression can be achieved. There would be no need for a new data definition language (DDL), no need to store this new DDL, and no need to figure out how to respect this DDL for compression purposes. Such a technique would require additional run-time overhead to always evaluate a predicate before determining if a row should or should not be compressed.

As described here, one or more embodiments of the invention include the compression of data rows in a database based on a predicate. The database user can specify a predicate of his or her choice (that is, a user-specified predicate) and enable compression for only that subset of data rows in a table that satisfies his or her predicate. Also, one or more embodiments of the invention include using new SQLs to implement predicate based compression for data rows in a table, as well as reducing CPU overhead by eliminating the need to decompress and compress back frequently used rows in a table. The techniques described herein additionally allow the database administrator extra semantics to propose compression of records that satisfy a certain predicate.

Consider the following example for a table 'Accounts_table' that has 100,000 records. An enterprise purpose of the organization dictates that accounting data be maintained for at least 10 years, though only the current year's data will be accessed. Assuming the current year is 2007 and there are 10,000 records for year 2007, the database users and/or applications will access these 10,000 records often, while the other 90,000 records are seldom accessed and are compressible.

One or more embodiments of the invention will allow the database administrator extra semantics to propose compression of records that belong only to the year 2007. For example, the following SQL statement will precisely solve this problem:
'Create table tablename enable compression where billingdate<2007'

The statement above is similar to a CREATE TABLE statement with the COMPRESS YES attribute set. It intends to create an empty table but with a compression constraint. The predicate in the create table statement can be similar in implementation to any table level constraint one might specify during create table time (for example, create table tablename constraint billdate check, (billingdate<2007)).

A dictionary can be built when a REORG RESETDICTIONARY is executed on the table. However, with such an implementation, not all rows of the table qualify for compression. The predicate specified at the create table statement will ensure that some of the rows in the table (for example, the most frequently accessed rows) do not qualify and thus do not gel compressed.

The REORG RESETDICTIONARY technique can also be used for tables that have data in them already but do not have a dictionary. As such, if compression is enabled using the alter table command, this warrants a REORG RESETDICTIONARY to ensure that all rows that satisfy the predicate and are compressible will be compressed. Similarly, when compression is enabled, any new row that is inserted via an insert statement, load or import technique will be eligible for compression, provided that it satisfies the predicate.

By using the techniques described herein, unnecessary decompression and/or compression of frequently used data rows in a database table can be avoided. This yields a considerable purchase in terms of CPU utilization. Additionally, database administrators do not have to partition their table to enable compression on less frequently used rows. Table partitioning comes with its own set of overheads such as, for example, indexing, separate compression dictionary, etc.

One implementation difference for the techniques described herein from, for example. DB2's current implementation is the structure of the data row in a page. The tuple (data row) can contain a new COMPRESSION BIT that indicates if this tuple has been subject to compression. One or more embodiments also contain a COMPRESSION identifier (ID) (CID) which will tell the database manager which bit-string in the tuple has been compressed by referring to the compression dictionary. The structure of the compression dictionary will not change.

In the existing DB2 implementation, for example, when compression is applied on a table, all rows that are compressible will be compressed. There exists no choice but to allow all these rows to get compressed, however frequently some of them might be used. As described herein, however, one or more embodiments of the present invention include disqualifying certain compressible rows from getting compressed due to the frequency with which they are accessed. As such, compressible rows can remain decompressed even if compression is specified on the table.

When a row is fetched into memory, the COMPRESSION BIT will indicate to DB2 if this has actually been subjected to compression. This way, one can achieve the flexibility of having both compressed and regular (decompressed) rows in the same database table. When an existing data row has to be compressed (for example, because there was an alter table with compression specified), the REORG RESETDICTIONARY that follows the alter table will set the compression bit and the compression ID. When a new compressible row is inserted, it will automatically be stored with the COMPRESSION BIT and the COMPRESSION ID fields in its structure.

When a compressed row has to be fetched, the index will locate the tuple ID (TID) (that is, tuple ID that contains the address (Page number+offset in page) of a data row in the index, wherein the index will use the KEY. TID pair to locate a particular row) of this row, and the page that contains this TID will be inputted and/or outputted into the page buffers. Decompression happens on the fly and the row can be read or modified. If the row is being read, it can be decompressed and read without having to recompress back. Only when one needs to perform an update to the row does one need to re-compress and store it back onto the data page. As such, one or more embodiments of the invention allow compressible rows to remain decompressed even if compression is specified on the table. Further, if a row is being updated and the length of the row changes, tuple overflow can occur.

The techniques described herein include modifications to existing SQL statements. For example, DB2 will now allow the following SQL statement:

'Create table <tablename> enable compression where <user-predicate>'
    The above statement will create a table called <tablename> and
will enable compression based on the predicate specified by
<user-predicate>.

A sample scenario, for example, can be as follows:
Create table table-name enable compression where billingdate<2000

/enable compression for thepredicate <2000.
    Insert into tablename values billingdate(1998)
    /will compress the date before inserting.
    Insert into tablename values billingdate(2008)
    /Insert the date. Does not require decompressing.
    Select * from tablename where billingdate =1998
    /Will decompress the date before fetching.
    Select * from tablename where billingdate =2008
    /Fetch the date. Does not require decompressing.

As another example, DB2 will now allow the following SQL statement:

'Alter table <tablename> enable compression where <user-predicate>'
    The above statement will alter <tablename> so that the
rows that satisfy <user-predicate> will now be compressed.

A sample scenario, for example, can be as follows:

Alter table tablename enable compression where billingdate=2008
    /Enable compression for the predicate =2008
    Insert into tablename values billingdate(2008)
    /Compress data and insert
    Select * from tablename where billingdate =2008
    /Decompress date and fetch For compression of rows that already exist in the table and satisfy the predicate, a REORG has to be performed.

Also, one or more embodiments of the present invention include modifications to the data row (tuple) structure. For example, the conventional compressed data row in a page looks as follows:

Also, one or more embodiments of the present invention include modifications to the data row (tuple) structure. For example, the conventional compressed data row in a page looks as shown by the data row 302 illustrated in FIG. 3. The conventional compressed data row 302 includes a header 304 and data 306.

Figure 3:
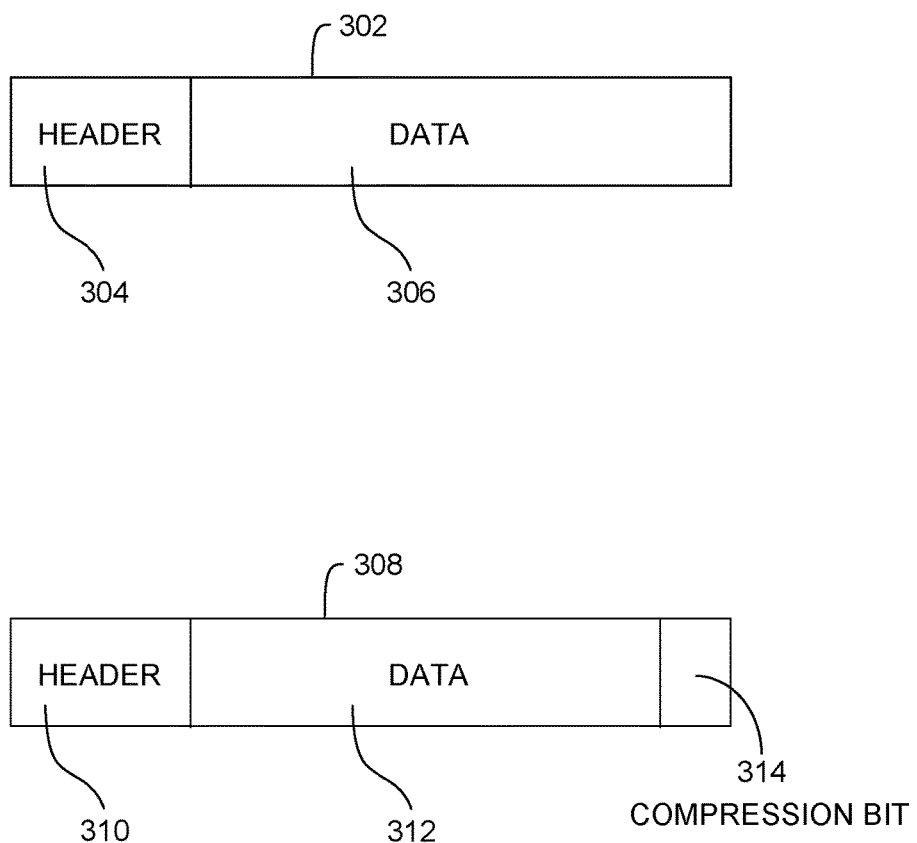
FIG. 3 is a schematic diagram illustrating a conventional compressed data row and a compressed data row according to an embodiment of the present invention.

However, the techniques described herein change the structure of a compressed data row, such as shown in in FIG. 3. A compressed data row 308, according to the techniques described herein, includes a header 310, data 312, and a compression bit 314.

The compression bit will indicate whether this particular row has been compressed or not. For example, the bit will be ON '1' if the tuple is compressed and OFF '0' if it is not compressed. The compression identifier (CID) maps the tuple with the correct compression string entry in the compression dictionary. The contents of the compression dictionary can remain the same, for example, as the current implementation in DB2.

One or more embodiments of the invention also include indices, wherein the indices will not care if a certain tuple is compressed or not. The indices will include the TID of each tuple whether it is compressed or not. When a certain data row needs to be fetched, the index will locate it from among the data pages and this page will be inputted and/or outputted into buffer as is. The index will continue to contain a KEY, TID pair irrespective of the TID belonging to a compressed or a regular (that is, uncompressed) row. The extra COMPRESSION BIT in the data row structure allows one to maintain the structure of indexes as they are.

Additionally, one or more embodiments of the invention include query caching. For example, frequently accessed rows, as per a predicate, can be fetched from a completely compressed table, expanded, and the query and the result set can be stored in the query cache. Next time, when the same query is executed, data can be fetched from the query cache rather than expanding the data again.

Also, the techniques described herein include additional modifications to query caching in existing approaches. For example, query caching in existing approaches intends to reduce I/O overhead for frequently used queries, whereas one or more embodiments of the invention reduce CPU overhead by eliminating the need to decompress and compress back frequently used rows in a table. Also, in existing approaches, the result set of the query is limited to the size of the query cache, whereas in the techniques described herein there is no limit as the result set is stored in secondary storage.

Existing approaches, additionally, can cache one query and the query has to be exactly the same every time one needs caching to take effect. For example, if the query one caches is "Select * from tablename where billingdate<2007," then this is the only query that can take advantage of the performance improvement due to caching. One or more embodiments of the invention, however, can run multiple queries on the result set. For example, if the create table statement looks like "Create table tablename enable compression where billingdate<2007," one can still run queries such as "Select * from tablename where company='IBM' AND billingdate<2007." Further, in existing approaches, the cache is cleared every time a db2 stop is issued, whereas, in one or more embodiments of the invention, the result set is stored in persistent memory, and is not lost when a db2 stop is issued.

With respect to performance when there is a query which has to fetch data from compressed rows and non-compressed rows, consider the existing DB2 implementation. Assume that all rows in a table have been compressed. A query that accesses these compressed rows has to decompress all of them first before using them. In one or more embodiments of the present invention, however, the query only needs to decompress that portion of the result set that has been compressed. The rest of the result set can be used as fetched from secondary storage. The only overhead is checking if each row has been compressed (compression bit).

The techniques described herein are advantageous over existing approaches such as, for example, compressing range partitioned tables. For example, range partitioning has its own overheads. The database has to bear the additional overhead of maintaining a range partition. For instance, the partition is a separate database object like any other table that can be detached or attached back to the mother table. As such, the overhead of maintaining any database object will apply to partitions as well. The optimizer has to consider partitioning before constructing access plans for queries. In one or more embodiments of the present invention, we do not create separate partitions. Therefore, the table remains intact and as it is, doing away with all of the overhead associated with maintaining a partition.

Additionally, partitions require separate indices for faster access. Indices come with their own overhead in terms of correct updating to indices, maintenance, etc. The techniques described herein do not require a separate index, but instead use a single index to access compressed as well as decompressed data.

Further, each partition that requires compression needs a separate compression dictionary associated with it exclusively. According to tests conducted, the size of the average dictionary in a customer environment is 74 kilobytes (KB). As such, this is additional storage overhead which is eliminated in one or more embodiments of the present invention, which uses a single dictionary for the entire table.

FIG. 1 is a flow diagram illustrating techniques for performing predicate-based data compression, according to an embodiment of the present invention. Step 102 includes specifying a predicate, wherein the predicate is specified by a user. Step 104 includes using the predicate to filter data compression, wherein using the predicate to filter data compression can include compressing one or more subsets of data that satisfy the predicate. Using the predicate to filter data compression can include, for example, compressing data based on access frequency using the predicate.

The techniques depicted in FIG. 1 can also include compressing data based on one or more usage statistics of the data, as well as using structured query languages (SQLs) to implement predicate-based data compression. Additionally, one or more embodiments of the invention can include, for example, providing a database administrator (DBA) one or more semantics to propose compression of one or more records that satisfy a predicate. Further, the techniques described herein also include using a single index to access compressed and decompressed data, as well as using a single dictionary for compressing a data table.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 2:
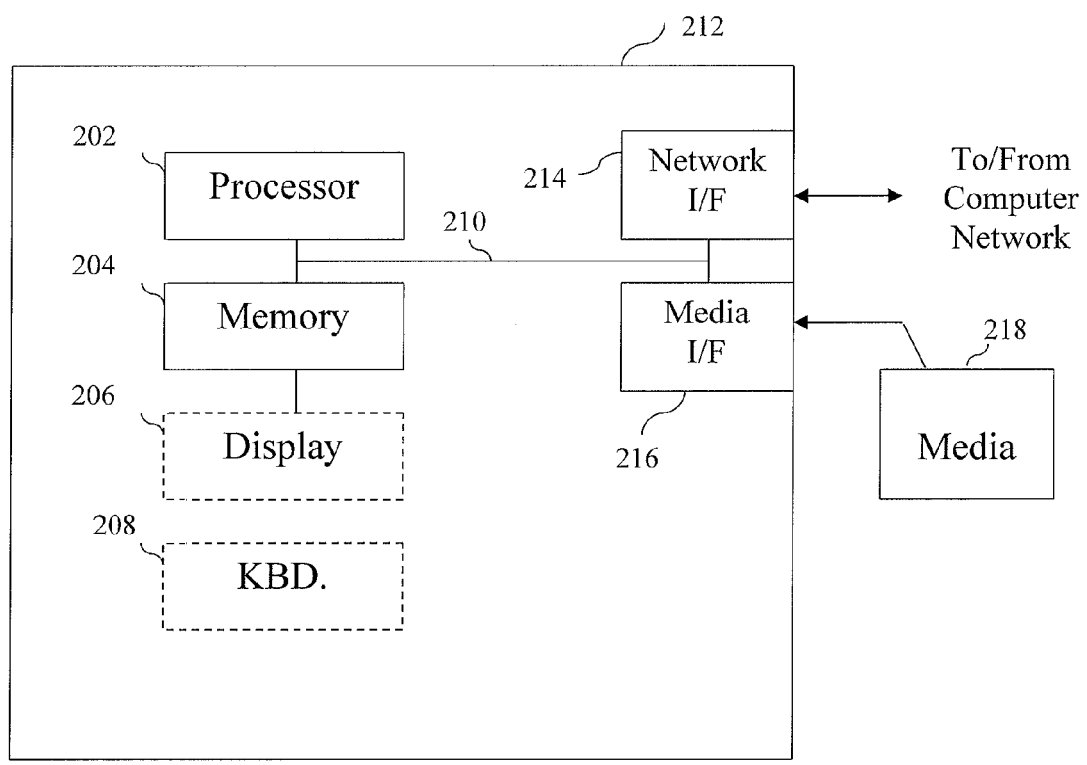
FIG. 2 is a system diagram of an exemplary computer system on which at least one embodiment of the present invention can be implemented.

At present, it is believed that the implementation will make substantial use of software running on a general-purpose computer or workstation. With reference to FIG. 2, such an implementation might employ, for example, a processor 202, a memory 204, and an input and/or output interlace formed, for example, by a display 206 and a keyboard 208. The term "processor" as used herein is intended to include any processing device, such as, for example, one that includes a CPU (central processing unit) and/or other forms of processing circuitry. Further, the term "processor" may refer to mote than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 202, memory 204, and input and/or output interface such as display 206 and keyboard 208 can be interconnected, for example, via bus 210 as pan of a data processing unit 212. Suitable interconnections, for example via bus 210, can also be provided to a network interface 214, such as a network card, which can be provided to interface with a computer network, and to a media interface 216, such as a diskette or CD-ROM drive, which can be provided to interface with media 218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 218) providing program code for use by or in connection with a computer or any instruction execution system. For the purposes of this description, a computer usable or computer readable medium can be any apparatus for use by or in connection with the instruction execution, system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 204), magnetic tape, a removable computer diskette (for example, media 218), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 202 coupled directly or indirectly to memory elements 204 through a system bus 210. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 208, displays 206, pointing devices, and the like) can be coupled to the system either directly (such as via bus 210) or through intervening I/O controllers (omitted for clarity).

Network adapters such as network interface 214 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application, specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, enabling a user to specify a predicate of his or her choice and enable compression for only that subset of data rows in a table that satisfies his or her predicate.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing predicate-based data compression on a relational database table, comprising the steps of:
   specifying a predicate, wherein the predicate is specified by a user, and wherein the predicate is a table level constraint; and
   using the predicate to filter data compression, wherein
      using the predicate to filter data compression comprises selectively compressing only one or more subsets of data rows in the relational database table that satisfy the predicate, wherein
      the one or more subsets of data rows that satisfy the predicate are the one or more subsets of data rows less frequently used by the user, wherein
      immediately after and as a result of compressing, the relational database table contains both a plurality of compressed rows corresponding with one or more subsets of data rows in the relational database table that satisfy the predicate and a plurality of decompressed rows that do not satisfy the predicate, wherein
      each data row of the one or more subsets of data rows includes a compression bit for indicating whether the data row has been subject to compression and a compression identifier for indicating which bit string in the data row has been compressed, and wherein the relational database table is not partitioned in response to the predicate-based data compression.

2. The method of claim 1, wherein using the predicate to filter data compression comprises compressing data based on access frequency using the predicate.

3. The method of claim 1, further comprising compressing data based on one or more usage statistics of the data.

4. The method of claim 1, further comprising using one or more structured query languages (SQLs) to implement predicate-based data compression.

5. The method of claim 1, further comprising a providing a database administrator (DBA) one or more semantics to propose compression of one or more records that satisfy a predicate.

6. The method of claim 1, further comprising using a single index to access compressed and decompressed data.

7. The method of claim 1, further comprising using a single dictionary for compressing a data table.

8. A computer program product comprising a non-transitory computer readable medium having computer readable program code for performing predicate-based data compression on a relational database table, said computer program product including:
   computer readable program code for specifying a predicate, wherein the predicate is specified by a user and wherein the predicate is a table level constraint; and
   computer readable program code for using the predicate to filter data compression, wherein
      using the predicate to filter data compression comprises selectively compressing only one or more subsets of data rows in the relational database table that satisfy the predicate, wherein
      the one or more subsets of data rows that satisfy the predicate are the one or more subsets of data rows less frequently used by the user,
      wherein immediately after and as a result of compressing, the relational database table contains both a plurality of compressed rows corresponding with one or more subsets of data rows in the relational database table that satisfy the predicate and a plurality of decompressed rows that do not satisfy the predicate, wherein
      each data row of the one or more subsets of data rows includes a compression bit for indicating whether the data row has been subject to compression and a compression identifier for indicating which bit string in the data row has been compressed, and wherein
      the relational database table is not partitioned in response to the predicate-based data compression.

9. The computer program product of claim 8, wherein the computer readable program code for using the predicate to filter data compression comprises computer readable program code for compressing data based on access frequency using the predicate.

10. The computer program product of claim 8, further comprising computer readable program code for compressing data based on one or more usage statistics of the data.

11. The computer program product of claim 8, further comprising computer readable program code for using one or more structured query languages (SQLs) to implement predicate-based data compression.

12. The computer program product of claim 8, further comprising computer readable program code for providing a database administrator (DBA) one or more semantics to propose compression of one or more records that satisfy a predicate.

13. The computer program product of claim 8, further comprising computer readable program code for using a single index to access compressed and decompressed data.

14. The computer program product of claim 8, further comprising computer readable program code for using a single dictionary for compressing a data table.

15. An apparatus for performing predicate-based data compression on a relational database table, comprising:
   a memory; and
   at least one processor coupled to said memory and operative to:
      specify a predicate, wherein the predicate is specified by a user and wherein the predicate is a table level constraint, and
      use the predicate to filter data compression, wherein
         using the predicate to filter data compression comprises selectively compressing only one or more subsets of data rows inn the relational database table that satisfy the predicate, wherein
         the one or more subsets of data rows that satisfy the predicate are the one or more subsets of data rows less frequently used by the user, wherein
         immediately after and as a result of compressing, the relational database table contains both a plurality of compressed rows corresponding with one or more subsets of data rows in the database table that satisfy the predicate and a plurality of decompressed rows that do not satisfy the predicate, wherein
         each data row of the one or more subsets of data rows includes a compression bit for indicating whether the data row has been subject to compression and a compression identifier for indicating which bit string in the data row has been compressed, and wherein
         the relational database table is not partitioned in response to the predicate-based data compression.

16. The apparatus of claim 15, wherein the at least one processor coupled to said memory and operative to use the predicate to filter data compression is further operative to compress data based on access frequency using the predicate.

17. The apparatus of claim 15, wherein the at least one processor coupled to said memory is further operative to compress data based on one or more usage statistics of the data.

18. The apparatus of claim 15, wherein the at least one processor coupled to said memory is further operative to use one or more structured query languages (SQLs) to implement predicate-based data compression.

19. The apparatus of claim 15, wherein the at least one processor coupled to said memory is further operative to provide a database administrator (DBA) one or more semantics to propose compression of one or more records that satisfy a predicate.

20. The apparatus of claim 15, wherein the at least one processor coupled to said memory is further operative to use a single index to access compressed and decompressed data.

* * * * *